US012694385B2

(12) United States Patent　　　　(10) Patent No.: US 12,694,385 B2
Kotkunde　　　　　　　　　　　　　　(45) Date of Patent: Jul. 28, 2026

(54) USER PATTERN ORIENTED METHOD AND SYSTEM FOR PREVENTION OF RISK IN CARD BASED TRANSACTIONS

(71) Applicant: Giesecke+Devrient Mobile Security Germany GmbH, Munich (DE)

(72) Inventor: Anjali Suresh Kotkunde, Pune (IN)

(73) Assignee: Giesecke+Devrient Mobile Security Germany GmbH, Munich (DE)

( * ) Notice: Subject to any disclaimer, the term of this patent is extended or adjusted under 35 U.S.C. 154(b) by 46 days.

(21) Appl. No.: 18/293,013

(22) PCT Filed: Jul. 27, 2022

(86) PCT No.: PCT/EP2022/025354
§ 371 (c)(1),
(2) Date: Jan. 29, 2024

(87) PCT Pub. No.: WO2023/006249
PCT Pub. Date: Feb. 2, 2023

(65) Prior Publication Data
US 2024/0330890 A1　　Oct. 3, 2024

(30) Foreign Application Priority Data
Jul. 29, 2021　(IN) ............................. 202121034129

(51) Int. Cl.
*G06Q 20/40*　　　(2012.01)
*G06Q 20/20*　　　(2012.01)
(Continued)

(52) U.S. Cl.
CPC ....... *G06Q 20/204* (2013.01); *G06Q 20/3574* (2013.01); *G06Q 20/389* (2013.01); *G06Q 20/4016* (2013.01)

(58) Field of Classification Search
None
See application file for complete search history.

(56) References Cited

U.S. PATENT DOCUMENTS

| 5,559,895 | A | 9/1996 | Lee et al. |
| 6,853,987 | B1 | 2/2005 | Cook |

(Continued)

FOREIGN PATENT DOCUMENTS

| WO | 2017127882 A1 | 8/2017 | |
| WO | WO-2020072419 A1 * | 4/2020 | ............. G06F 21/44 |

OTHER PUBLICATIONS

Indian Search Report from corresponding IN Application No. 202121034129, Mar. 14, 2023.

(Continued)

*Primary Examiner* — Bennett M Sigmond
*Assistant Examiner* — Bhavin D Shah
(74) *Attorney, Agent, or Firm* — Workman Nydegger

(57) ABSTRACT

A method is provided to effectively preempt or prevent any instance of fraudulent, or otherwise unauthorized and/or undesired use of a Card by dynamic, user-configurable profiling of user and/or usage pattern information. The system implementation includes a duo of Payment applet and Fraud Rule detection Applet in separate packages provided on the Card and a Mobile Applet on smart phone of the Card owner, which trio interactively enabling the Card holder to keep and configure the CRM rules for effectively safeguarding against fraudulent and/or undesired transactions using the Card.

9 Claims, 1 Drawing Sheet

(51) Int. Cl.
  *G06Q 20/34*      (2012.01)
  *G06Q 20/38*      (2012.01)
  *H04L 9/40*       (2022.01)

(56)              References Cited

U.S. PATENT DOCUMENTS

| | | | |
|---|---|---|---|
| 6,873,715 | B2 | 3/2005 | Kuo et al. |
| 7,136,841 | B2 | 11/2006 | Cook |
| 2002/0138351 | A1 | 9/2002 | Houvener et al. |
| 2020/0104474 | A1* | 4/2020 | Duane ................ G06Q 20/4016 |

OTHER PUBLICATIONS

International Search Report from corresponding PCT Application
No. PCT/EP2022/025354, Nov. 22, 2022.

\* cited by examiner

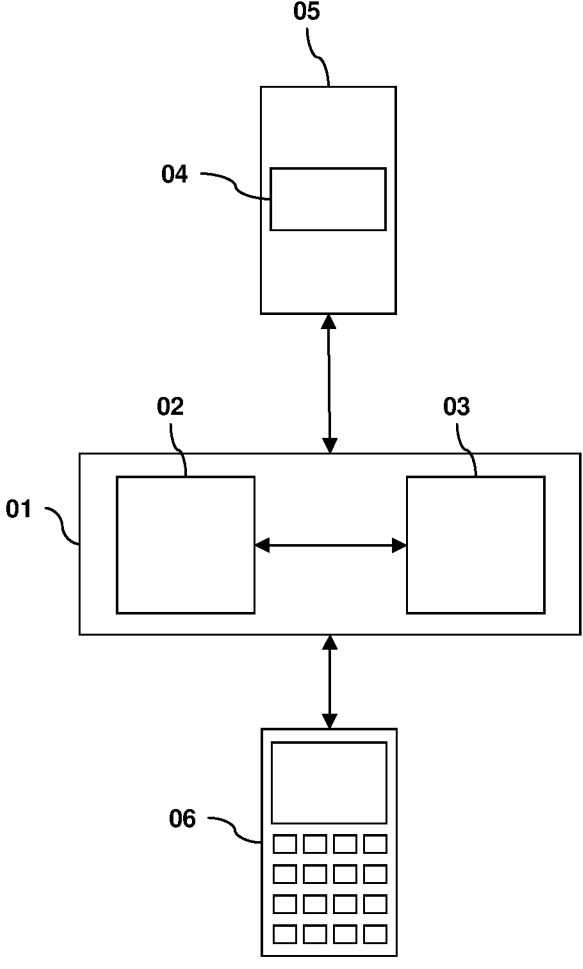

USER PATTERN ORIENTED METHOD AND SYSTEM FOR PREVENTION OF RISK IN CARD BASED TRANSACTIONS

FIELD OF THE INVENTION

This invention relates generally to the field of risk management methodologies applied for prevention of risks in transactions involving secure elements, especially credit cards. The present invention more particularly outlines an inventive approach directed at preventing unauthorized and/or undesired use of credit cards based on dynamic, user-configurable profiling of user and/or usage pattern information.

Definitions

Before undertaking the description of the invention below, it may be advantageous to set forth definitions of certain words or phrases used throughout this patent document. Also, as some technical terms are not used uniformly in the field of the instant invention, a few definitions are given in the following to clarify the meaning of terms as they are used in this paper. Accordingly, the underlying terms shall have the respective assigned meanings—

"Card" refers both payment and non-payment cards including a Secure Element;

"EMV" refers payment method based upon a technical standard, originally derived from the names Europay, Mastercard, and Visa;

"Secure Element" refers a microprocessor chip which can store and essentially act as a vault for data and run secure apps;

"CRM" refers Card Risk Management;

"PIN" refers Personal Identification Number;

"POS" refers Point Of Sale;

"IMEI" refers International Mobile Equipment Identity number;

"SIM" refers Subscriber Identity Module;

"User pattern" refers either or both among the pattern of users and usage associated with a Card;

"OTA" refers Over The Air via wireless communication network;

"NVM" refers nonvolatile memory of the Card;

"NFC" refers Near Field Communications;

"GENAC commands" refers slandered Payment processing command issued by EMV.

BACKGROUND

Use of payment cards, such as credit or debit cards, is being increasingly preferred over cash in most parts of the world today. However, incidences of unauthorized and/or undesired usage of said payment cards are not rare. Understandably, these incidences cause financial hardships, trust issues, and emotional tribulation for people who are victims, in addition to making those aware to therefore shy away from adopting card-based transactions.

While in theory, the use of payment cards is supposed to reduce risks associated with electronic transactions. This is somewhat achieved when physical swiping, signature verification check, authentication using PIN or biometric data is possible during the checkout process. However, this is restricted to real-world POS terminal/merchant locations and not for online transactions (referred in the industry as 'Card Not Present' type transactions) or contactless cards where a much higher incidence of fraudulent, or otherwise unauthorized and/or undesired use of payment cards is experienced due to lack of able means for preventing and/or addressing the same.

The aforementioned issues have largely stifled the confidence required among the general populace for global acceptance of secure electronic transactions. The card industry is thus continually on the lookout for advanced means for real-time identification, management, and prevention of fraudulent, or otherwise unauthorized and/or undesired use of payment cards.

State of art, to the extent referenced by the inventor(s) named herein, mentions a few scattered references targeting the issues voiced hereinabove. In one way, Card issuing authorities (namely banks and the like) appoint well-trained fraud specialist investigators for investigate suspicious transactions. However, their involvement is triggered when a Card holder calls or writes to the concerned Card issuing authority to report a fraudulent, or otherwise unauthorized and/or undesired transaction—this is time consuming, as well as resource intensive, besides being handicapped by expertise of investigators involved, and above all, severely limited by the number of cases that can be catered to in parallel.

Another method seen to be proposed in the art involves associating mobile phones using the IMEI (of the phone) or phone number (of the SIM installed or received in the phone) with a specific credit card and using the phone instead of the card as the identifying credential. However, this method too remains susceptible to fraudulent use because only the phone, and not the Card owner, is authenticated, thus stolen or lost phones could be easily used to make transactions without presence or authentication of the Card owner.

Yet another approach seen to be disclosed, is adoption of neural networks, which employ complex algorithms to continuously map known fraudulent transactions, in search of patterns that can be used to model and hence screen ongoing transactions with the hope of identifying and declining fraudulent transactions at the point of sale. However, this approach of using neural network pattern recognition is yet nascent and largely empirical, hence falls short of addressing the needs of art once and for all.

DESCRIPTION OF RELATED ART

While there were many art references researched by the inventor(s) in ensuring that the present invention is novel, the following art was identified as more closely related to the present invention, and thus worthwhile to discuss in more detail in context of the present invention.

For example, U.S. Pat. No. 6,873,715 (issued to Kuo) teaches adoption of central signature verifications and electronic receipt transmissions. system takes a photograph of the signature on the back of a payment card and displays the photograph on a screen to make it easier for a cashier at the merchant location to compare the receipt signature with the payment card signature Another example are U.S. Pat. Nos. 7,136,841 and 6,853,987 (issued to Cook) teach systems that capture a signature "phrase" from a customer in an electronic commerce transaction as an added layer of fraud protection. A signature phrase is essentially the same as a PIN as used in debit cards, or a password as used in the Verified By Visa system.

Yet another example is U.S. Pat. No. 5,559,895 (issued to Lee et al) which utilizes a personal computer that is "locally owned and operated" by a merchant to perform signature verification locally at a Point-Of-Sale location, whereas the present invention utilizes a "remotely located" computer, that is "independently owned and operated" by an entity other than the merchant (i.e. the payment card issuing bank) to perform signature verification.

Yet another example is US20020138351 (filed by Houvener et al) which involves retrieving previously stored personal identification information from a remote database, and comparing the remotely retrieved personal information with the same information captured at a Point-Of-Sale location to verify a purchasers identity.

As evident from the discussion above, the conventional and prior art risk mitigation/detection methods are invariably based primarily on setting predetermined thresholds/ markers and then monitoring service records to detect when a threshold/marker has been exceeded. This is an able way for investigating after fraudulent, or otherwise unauthorized and/or undesired use has happened, but not effectively preempting or preventing any instance of fraudulent, or otherwise unauthorized and/or undesired use of a Card. Plus, none of these methods can detect/avoid disasters if hacking is done at server side. Therefore, the need for advanced means for real-time identification, management, and prevention of fraudulent, or otherwise unauthorized and/or undesired use of payment cards still persists the world over in want of a suitable and effective solution.

Attention of the reader is now sought to the underlying objectives, which highlight key thrust areas intended to be achieved by the present invention for embodying the suitable and effective solution needed in the art.

Objectives of the Invention

The present invention is identified in addressing at least all major deficiencies of art discussed in the foregoing section by effectively addressing the objectives stated under, of which:

It is a primary objective to provide a method whereby fraudulent, or otherwise unauthorized and/or undesired Card-based transactions can be precisely identified and automatically declined in real time, therein pre-emptively avoiding risk to the owner of said Card.

It is another objective besides to the aforesaid objective(s) that more and more legitimate transactions are automatically authenticated and consequentially approved, therein increasing user confidence in the system.

It is another objective besides to the aforesaid objective(s) that the user is enabled for selecting and configuring CRM rules/policies.

It is another objective further to the aforesaid objective(s) that the present invention avoids the costs, time, and efforts of escalating any suspected whereby fraudulent, or otherwise unauthorized and/or undesired Card-based transactions to a human assessor/specialist.

It is another objective further to the aforesaid objective(s) that implementation of the present invention mirrors real world checkout processes and does not impose any additional processes on part of the Card holder which tends to adversely impact merchants/POS locations otherwise due to midway cart abandonment or voluntary abandonment of transactions by the Card owners.

It is another objective further to the aforesaid objective(s) that implementation of the present invention does not incur any undue costs and/or technical complexities.

The manner in which the above objectives are achieved, together with other objects and advantages which will become subsequently apparent, reside in the detailed description set forth below in reference to the accompanying drawings. Other advantageous embodiments of the invention are specified in the dependent claims.

Summary/Statement of the Invention

The present invention attempts to resolve the wants of art, by meeting the objectives stated hereinabove. Specifically, a method is provided to effectively preempt or prevent any instance of fraudulent, or otherwise unauthorized and/or undesired use of a Card by dynamic, user-configurable profiling of user and/or usage pattern information. The information, including historical transaction data along with few other parameters such as geo-location and spending pattern are stored on the Card, and whereby validation of a transaction is done by means of an applet installed on the Card, in accordance with fraud rule management pre-configured at instance of the user.

BRIEF DESCRIPTION OF DRAWINGS

The present invention is explained herein under with reference to the following drawings, in which:

FIG. 1 is a block level diagram illustrating composition of the execution environment of the present invention.

The above drawing is illustrative of particular examples of the present invention but are not intended to limit the scope thereof. These drawings are intended for use solely in conjunction with their explanations in the following detailed description. Also, in these drawings, wherever possible, the same references and symbols have been used throughout to refer to the same or similar parts. Though numbering has been introduced to demarcate reference to specific components in relation to such references being made in different sections of this specification, all components are not shown or numbered in each drawing to avoid obscuring the invention proposed.

Attention of the reader is now requested to the detailed description to follow which narrates a preferred embodiment of the present invention and such other ways in which principles of the invention may be employed without parting from the essence of the invention claimed herein.

DETAILED DESCRIPTION

The present invention is directed at absorbing all advantages of prior art while overcoming, and not imbibing, any of its shortfalls, to thereby establish a novel as well as inventive approach of preventing fraudulent and otherwise unauthorized and/or undesired use of Cards for online or in-store purchases.

Conventional CRM methodologies are based on the Card issuing authority's risk taking capability and rules/parameters which can be configured by said Card issuing authority. The present invention proposes to build on this premise by further enabling the Card holder to keep and configure the CRM rules.

Attention of the reader is now requested to a sample use-case of implementing the present invention, which is explained in detail with reference to the accompanying FIG. 1. As seen here, execution environment of the present invention comprises of a Card (01) intended to interact with a POS terminal (06) where a payment transaction is to be undertaken.

In a foundational aspect hereof, the card (01) is supplied with two applets, Payment applet (02) and Fraud Rule detection Applet (03). The Payment applet (02) is programmed to log and share transactional data (parameters of the any transaction being undertaken by the card holder) with the Fraud Rule detection applet (03). The Fraud Rule detection Applet (03) on the other hand, is programmed for authenticating current transactional data (parameters of the instant transaction being undertaken by the card holder) with previous transaction logs and CRM data set by Card holder/owner.

As will be explained later in this document, the Fraud Rule detection Applet (03) is programmed to be invoked in every transaction being undertaken using the card (01). Alternatively, due to restriction on performance of contactless transactions, the Fraud Rule detection applet (03) is programmed to get invoked only on transaction on contact interface at any POS.

According to a related aspect, the interactive applets (02 and 03) are provided to the card (01) in discrete separate packages. In one embodiment hereof, said discrete separate packages of the applets (02 and 03) are provided to the card (01) during the issuance/production stage of the card (01). In an alternative embodiment hereof, the discrete separate packages of said applets (02 and 03) are provided to the card (01) or on previously-issued cards, as an OTA update to the NVM of said card (01).

As will be appreciated, the aforementioned OTA update is provided via specialized machines/trusted systems in charge of the card issuer (in context of payment cards, also referred to as Issuer script commands which are done at special trusted machines).

In another foundational aspect hereof, a Mobile Applet (04) is provided for installation on smart phone (05) owned/in charge of the owner of the Card (01), for providing a user interface/menu necessary for said Card holder to configure, on the go, the Fraud Rule detection Applet (03) via NFC method. The Mobile Applet (04) is programmed to record details of the transaction being entered, maintain previous transaction logs and manifest an interface menu for allowing the card owner to establish Card Risk Management data and responding to nullification alerts received for transactions determined as fraudulent. The Mobile Applet (04) may be provided for installation on the smart phone via an online app store or download from other online/offline platform as may be practiced conventionally in the art.

The aforementioned Mobile Applet (04) is programmed for allowing the Card holder to input profile data (during first time use since issuance) and thereafter allow the Card holder to establish and update, on the go, a set of rules/policy for preventing fraudulent and otherwise unauthorized and/or undesired use of Cards for online or in-store purchases. Mobile Applet (04) also shares transaction logs with the Fraud rule detection applet Fraud Rule detection applet (03).

According to another aspect hereof, the Mobile Applet (04) is programmed to compute predictable usage terms for the Card on basis of inputs entered by the Card owner. For example— a) For a Geo-location trajectory specified by the user, 50 points on said Trajectory are mapped and converted into points on basis of which an array is created where the Card holder is expected to use the Card;

b) For a tangible amount used in frequent transaction specified by the Card owner, lower and upper threshold of amounts are defined that the Card holder is expected to transact using the Card;

c) For a city name/pincode specified by the Card owner, nearby places are mapped by pin-codes, where the user is most likely/expected to go and use the Card.

Implementation of the present invention initiates at any instance of a transaction being initiated using the Card (01). This occurs typically during the first GENAC command. On this cue, the Mobile Applet (04) is invoked to share the transaction log/parameters/details with the Fraud rule detection applet (03) which then logically decides for allowing/disallowing the transaction based on agreement between the transaction log parameters conveyed by the Mobile Applet (04) and standard data which is entered by Card holder and/or predictable usage terms defined as per the foregoing narration.

Importantly, the decisioning process undertaken by the Fraud rule detection applet (03) is weighted using reaction codes—for example, GeoLocation (either or both among GPS-based and/or IP-based values), Transaction Time, Amount, City Code are given as highest preference over other parameters as may be selected for implementation of the present invention. If any of these parameters are not matching then reaction code 0x01 is sent, which acts to nullify the transaction initiated, thereby preventing fraudulent and otherwise unauthorized and/or undesired use of the Card.

According to another aspect of the present invention, the reaction code is added in standard EMV response to the POS Terminal (06), to thereby initiate authentication of the Card holder before sending response to Card issuer to complete the Card transaction, to therefor ensure comprehensive security of the transaction being entered into by the card holder.

Nullification of the transaction is informed/alerted to the card owner via messaging means such as SMS. The card owner may respond to such message via the Mobile Applet (04) or chose to remain inactive to halt the entire transaction. Alternatively, the card owner may override the nullification via menu of the via the Mobile Applet (04) in instance of genuine exceptions to originally-framed rules for safe implementation of the card (01).

Therefore as can be appreciated by the reader, a mass-utilizable method and system for prevention of risk in card-based transactions is provided by the present invention, by which characteristically, A user can restrict use of card outside safe zone, said safe zone being defined on basis of standard data which is entered by Card holder and/or predictable usage terms defined as per the foregoing narration;

Is a solution at card and terminal side to effectively detect payment fraud before a transaction gets propagated till issuer for authentication.

In this paper, the present invention has been described mostly in relation to payment cards. However, the reader shall appreciate that this application is merely illustrative and not restrictive, and that the present invention can be essentially implemented in further use-cases including secure elements for non-payment transactions such as access cards, telephone calling cards, loyalty cards, stored-value cards and the like, without essentially departing from the basic essence of the present invention.

It shall be generally understood by the reader that although the present invention is described herein using specific terms, these are used in a generic and descriptive sense only and are not intended to be limiting. The present invention is outlined by the scope of the appended claims.

The invention claimed is:

1. A method for prevention of fraudulent transactions while using a card at any POS terminal, comprising:

a) provisioning, on a smart phone in charge of the owner of the card, a Mobile Applet programmed to record details of the transaction being entered, maintain previous transaction logs and manifest an interface menu for allowing the card owner to establish Card Risk Management data and responding to nullification alerts received for transactions determined as fraudulent;

b) provisioning the card with—
   a Fraud Rule detection Applet programmed for authenticating details of the transaction being entered with previous transaction logs and Card Risk Management data set by Card holder/owner; and
   a Payment applet programmed to log and share details of the transaction being entered with the Fraud Rule detection applet;

c) at any instance of initiation of a payment transaction using the card at any POS terminal, invoking the Mobile Applet on the smart phone to relay the details of the transaction being entered to the Fraud Rule detection Applet on the card; and d) upon receiving, the details of the transaction being entered from the Mobile Applet, executing the Fraud Rule detection Applet on the card to arrive at a decision between allowing and disallowing the transaction being entered by comparing the details of the transaction being entered with the previous transaction logs and the Card Risk Management data, to thereby abort fraudulent transactions while using the card at any POS terminal.

2. The method for prevention of fraudulent transactions while using a card at any POS terminal according to claim 1,
wherein provisioning the card with a Payment applet and a Fraud Rule detection Applet in discrete packages is undertaken as a stage in a process selected between the issuance and production of the card.

3. The method for prevention of fraudulent transactions while using a card at any POS terminal according to claim 1,
wherein provisioning the card with a Payment applet and a Fraud Rule detection Applet in discrete packages is undertaken as an OTA update to the NVM of said card.

4. The method for prevention of fraudulent transactions while using a card at any POS terminal according to claim 1, wherein framing at instance of the card owner, the terms for allowance of transactions using the card is undertaken by means of the Mobile Applet whereby the card owner is at choice of defining a set of parameters including GeoLocation, Transaction Time, Amount, City Code which are and alternatively likely to be incidental to usual usage of the card by the card owner.

5. The method for prevention of fraudulent transactions while using a card at any POS terminal according to claim 1,
wherein decisioning includes either between:
   a) allowing the transaction being entered if the parameters of the Card Risk Management data, previous transaction logs and details of the transaction being entered match; and b) disallowing the transaction being entered if the parameters of the Card Risk Management data, previous transaction logs and details of the transaction being entered do not match.

6. The method for prevention of fraudulent transactions while using a card at any POS terminal according to claim 5, wherein decisioning further includes issuance of an nullification alert via SMS to the card owner for inviting his response to be entered via the Mobile Applet, the response being chosen between:

a) inaction, to therefore avoid the transaction being entered;

b) confirmation by reply SMS, to therefore avoid the transaction being entered; and c) overriding the nullification by reply SMS, to therefore allow the transaction being entered.

7. A system for prevention of fraudulent transactions while using a card at a POS terminal, comprising:

a) a Mobile Applet for installation on a smart phone of the card owner, said Mobile Applet being programmed to record details of the transaction being entered, maintain previous transaction logs and manifest an interface menu for allowing the card owner to establish Card Risk Management data and responding to nullification alerts received for transactions determined as fraudulent;

b) a card provisioned with a discrete pair of applets being a Fraud Rule detection Applet programmed for authenticating details of the transaction being entered with previous transaction logs and Card Risk Management data set by Card holder/owner and a Payment applet programmed to log and share details of the transaction being entered with the Fraud Rule detection applet.

8. The system for prevention of fraudulent transactions while using a card at a POS terminal according to claim 7, wherein the card is selected between payment and non-payment cards.

9. The method for prevention of fraudulent transactions while using a card at any POS terminal according to claim 1, further comprising, when disallowing the transaction being entered, generating a reaction code inserted into a standard EMV response to the POS terminal that causes the terminal to abort the transaction locally.

\* \* \* \* \*